United States Patent
Rehse

(10) Patent No.: US 7,828,435 B1
(45) Date of Patent: Nov. 9, 2010

(54) METHOD FOR DESIGNING AN ANTERIOR CURVE OF A CONTACT LENS

(76) Inventor: Denis Rehse, 532 Dolphin Ave., SE., St. Petersburg, FL (US) 33705

( * ) Notice: Subject to any disclaimer, the term of this patent is extended or adjusted under 35 U.S.C. 154(b) by 0 days.

(21) Appl. No.: 12/699,238

(22) Filed: Feb. 3, 2010

(51) Int. Cl.
*G02C 7/02* (2006.01)

(52) U.S. Cl. .................................................. 351/177

(58) Field of Classification Search ................. 351/212, 351/219, 246, 247, 160 R, 177
See application file for complete search history.

(56) References Cited

U.S. PATENT DOCUMENTS

| | | | |
|---|---|---|---|
| 4,525,043 A | 6/1985 | Bronstein | |
| 5,050,981 A | 9/1991 | Roffman | |
| 5,164,750 A | 11/1992 | Adachi | |
| 5,220,359 A | 6/1993 | Roffman | |
| 5,296,881 A | 3/1994 | Freeman | |
| 5,349,394 A | 9/1994 | Freeman et al. | |
| 5,493,350 A | 2/1996 | Seidner | |
| 5,570,142 A | 10/1996 | Lieberman | |
| 5,953,098 A | 9/1999 | Lieberman et al. | |
| 5,963,300 A | 10/1999 | Horwitz | |
| 6,086,204 A | 7/2000 | Magnante | |
| 6,379,008 B1 | 4/2002 | Chateau et al. | |
| 6,634,751 B2 | 10/2003 | Turner et al. | |
| 6,802,605 B2 | 10/2004 | Cox et al. | |
| 6,932,475 B2 | 8/2005 | Molebny et al. | |
| 7,029,117 B2 | 4/2006 | Suzaki et al. | |
| 7,097,302 B2 | 8/2006 | McGregor | |
| 7,111,938 B2 | 9/2006 | Andino et al. | |
| 7,172,285 B1 | 2/2007 | Altmann et al. | |
| 7,241,311 B2 | 7/2007 | Norrby et al. | |
| 2004/0017544 A1 | 1/2004 | Roffman et al. | |
| 2006/0274268 A1 | 12/2006 | Andino et al. | |
| 2007/0093891 A1 | 4/2007 | Tabernero et al. | |
| 2008/0055545 A1 | 3/2008 | Clamp | |

*Primary Examiner*—Jack Dinh
(74) *Attorney, Agent, or Firm*—Harvey Kauget; Phelps Dunbar LLP

(57) ABSTRACT

In accordance with the disclosure there is described herein a method of designing an anterior curve of a contact lens for the eye of a patient comprising the steps of providing a contact lens material having a posterior, a posterior curve having a predetermined asphericity, an anterior, an index of refraction and a center thickness; providing a geometry of a cornea, a distance power correction for the cornea and a near power correction for the cornea; determining a central distance power of the contact lens in air; calculating a central anterior radius of the contact lens using the posterior curve of the contact lens material, the index of refraction of the contact lens material, the center thickness of the contact lens material and the central distance power of the contact lens in air; calculating a center power of the contact lens on the eye of the patient using the index of refraction of tears at the posterior of the contact lens; and using an on-eye ray trace, said on-eye ray trace having a null lens compensation to create a targeted on-eye power profile.

9 Claims, 1 Drawing Sheet al1 angle of incidence of incoming ray
asl angle of slope $(\frac{dy}{dx})$ of asl = atan (slope 1)
ar1 angle of refracted ray
au1 angle of ray away from horizontal
ai2 angle of incidence on posterior surface
ar2 angle of refracted ray leaving posterior surface

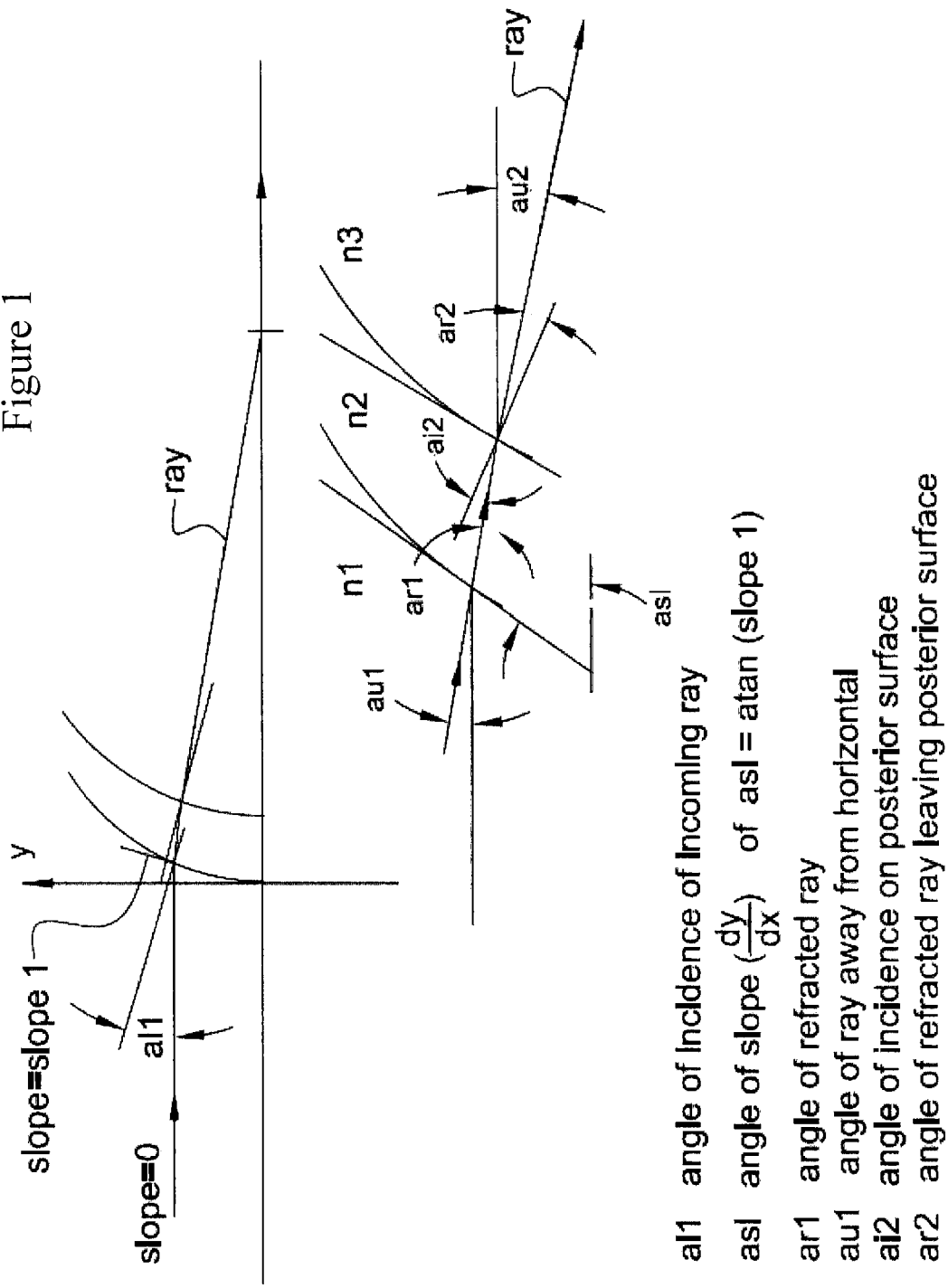

METHOD FOR DESIGNING AN ANTERIOR CURVE OF A CONTACT LENS

FIELD OF INVENTION

The present invention generally relates to a method for designing a contact lens to provide an optimal corrective lens-eye system. More specifically, the present invention defines a method for designing an anterior curve of a contact lens for the eye using a null lens.

BACKGROUND OF THE INVENTION

Conventional contact lenses are generally designed to improve the visual acuity of the human eye. The human eye frequently does not constitute a perfect optical system, but instead suffers from optical imaging errors which are known as ocular aberrations.

Ray tracing is one method of analyzing an optical system. It usually involves calculating parallel light rays entering an optical system and calculating the path of each ray of light. In some instances, the ray trace is included in the lens calculation to control the power profile of the lens.

In the case of soft contact lenses, ray tracing can be used to control the power profile of a lens. This power profile, if held constant, will correct spherical aberration and if properly varied, can correct for presbyopia. Soft contact lenses are usually designed to drape on the eye. The posterior surface of the lens will assume the shape of the eye and the power of the lens is added to the power of the eye. This is true for the entire power profile. The ray trace of the soft lens can be calculated in air since the power profile is added to the eye to cause the desired correction to the eye. The required correction is usually in the form of a Distance Power and an Add Power.

In the case of rigid or semi-rigid contact lenses with a spherical posterior curve, if the posterior curve is selected equal to the curvature of the eye, then the in-air ray trace power profile will add to the power of the eye as does the soft lens. However, if for fitting purposes, the posterior curve needs to be steeper by 0.5 diopters, then the entire power profile of the lens will be decreased by 0.5 diopters in order to maintain the same on-eye powers prior to the fitting change. The in-air ray trace works well for these lenses because the posterior lens curve closely matches the curvature of the eye.

A large number of rigid or semi-rigid contact lenses are designed with aspheric posterior curves that have various eccentricities. For a family of these lenses, where optic zone and posterior eccentricity are held constant, the add power of the lens will change with the posterior central radius such that a smaller conic section will have a larger power shift than a larger conic section. The add power will also change with the power of the lens because of spherical aberration. This will increase the add power on plus power lenses and reduce the add power on negative power lenses.

The posterior asphere can serve to stabilize the fit of the lens on the cornea and to provide a positive power shift from the center of the lens to the edge of the optic zone. The anterior curve of these lenses are usually spherical or, for higher adds, bifocal curves are used. The distance power is usually in the center of the lens and the posterior asphere provides peripheral positive power shift. When an anterior bifocal curve is used, the plus power is out from the center of the lens.

Ray tracing a lens with a posterior asphere in air shows a large power shift due to the posterior aspheric surface. This power shift is caused by the change in radius multiplied by the change in index of refraction from lens material to air. A typical fluoropolymer lens material has an index of refraction of approximately 1.466. Air has an index of refraction of approximately 1.0008. The power shift contribution due to the posterior asphere in air is the change in posterior radius (delta R) multiplied by the change in index of refraction at the back of the lens, i.e. (delta R)*(1.466-1.0008). However, when placed on the eye, the back of the lens is filled with tears having an index of refraction of approximately 1.336 and the calculation for the power shift becomes (delta R)*(1.466-1.336). Therefore, the on-eye power shift is less than 28% of that calculated in air for the same aspheric posterior curve.

Ray tracing can be used to control a power profile that causes a power change as a function of distance from the center of the lens. If the power profile is calculated in air, the profile on the eye will not be the same. The index of refraction in air (1.0008) is different from the tears of the eye and the eye (1.336). Furthermore the normal eye does not show spherical aberration.

There is a need to provide a lens design that incorporates a method of obtaining a lens that exhibits the desired power profile in situ.

However, in view of the prior art taken as a whole at the time the present invention was made, it was not obvious to those of ordinary skill how the identified need could be fulfilled.

BRIEF SUMMARY OF THE INVENTION

In one embodiment according to the present invention, a method of designing an anterior curve of a contact lens for the eye of a patient comprising the steps of providing a contact lens material having a posterior, a posterior curve having a predetermined asphericity, an anterior, an index of refraction and a center thickness; providing a geometry of a cornea, a distance power correction for the cornea and a near power correction for the cornea; determining a central distance power of the contact lens in air; calculating a central anterior radius of the contact lens using the posterior curve of the contact lens material, the index of refraction of the contact lens material, the center thickness of the contact lens material and the central distance power of the contact lens in air; calculating a center power of the contact lens on the eye of the patient using the index of refraction of tears at the posterior of the contact lens; and using an on-eye ray trace, said on-eye ray trace having a null lens compensation to create a targeted on-eye power profile.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

FIG. 1 is a schematic view of the path of a horizontal ray of light that intersects the anterior surface of a contact lens according to one embodiment of the present invention.

DETAILED DESCRIPTION OF THE INVENTION

The contact lens design of the present invention allows for the control of the power from the center of the lens to the edge of the optic zone when the lens is placed on the eye. This control of the power is accomplished through ray tracing.

Specifically, the contact lens design is constructed with a lens system by using ray tracing. A ray of light is incident on a point on the anterior surface with a selected slope and proceeds through to the predefined posterior asphere. As the ray of light exits it will encounter a Null Lens described as follows:

A mathematically thin lens, that is a lens in which the anterior radius is virtually the same as the posterior radius and the lens thickness is virtually zero will have zero power and zero spherical aberration in air.

This null lens can be verified by examining the path of a horizontal ray of light that intersects the anterior surface of a contact lens as shown in FIG. 1.

The angle of incidence of the ray of light, $ai1$, is:

$$ai1 = \pi/2 - a\tan(\text{slope 1})$$

The angle of refraction of the ray of light is obtained using Snell's Law as:

$$ar1 = a\sin(n1 * \sin(ai1)/n2)$$

The slope of the refracted ray of light as it passes through the lens is of angle:

$$au1 = ai1 - ar1$$

The refracted ray of light encounters the posterior surface at the point $(x2, y2)$ where:

$$x2 = x1 + d*\cos(au1)$$

$$y2 = y1 + d*\sin(au1)$$

For a thin lens $d=0$ and $(x2, y2) = (x1, y1)$. Furthermore, the slope of the posterior surface is the same as the slope of the anterior surface at $(x1, y1)$. The angle of incidence of the ray of light at the posterior surface is:

$$ai2 = ai1 - au1 \text{ [where } au1 = ai1 - ar1\text{]}$$

$$ai2 = ai1 - (ai1 - ar1) = ar1$$

The refracted ray of light from the posterior surface has the angle:

$$ar2 = a\sin(n2*\sin(ai2)/n3) \text{ [where } ai2 = ai1 - (ai1 - ar1) = ar1\text{]}$$

$$ar2 = a\sin(n2*\sin(ar1)/n3) \text{ [where } ar1 = a\sin(n1*\sin(ai1)/n2)\text{]}$$

$$ar2 = a\sin(n2*\sin\{a\sin(n1*\sin(ai1)/n2)\}/n3)$$

Simplifying by $\sin(a\sin(x)) = x$ $$ar2 = a\sin(n2*(n1*\sin(ai1)/n2)/n3)$$

$$ar2 = a\sin(n1*\sin(ai1)/n3) \text{ [Note this equation is from Snell's Law for passing from index n1 to index n3 as if the thin lens were not there. This is the same as } ar1 = a\sin(n1*\sin(ai1)/n2) \text{ with n3 substituted for n2.]}$$

If this mathematically thin lens, a Null Lens, is placed on an eye that has the same curvature as the Null Lens, it will not change the power or the power profile of the eye. However, if an on-eye ray trace is performed on this Null Lens, the results show a significant spherical aberration. This spherical aberration is the spherical aberration of the eye itself and must not be corrected. The eye internally corrects its own spherical aberration as achieved through eons of evolution.

The power shift to give the null lens zero spherical aberration is used to adjust the focus of the ray of light to give the power to the lens, as it will be used on the eye. The slope of the anterior surface is adjusted to obtain the desired power for that ray of light. This is repeated for the entire optic zone.

Through the incorporation of a Null Lens in the ray trace calculation, the present invention allows the complexities of the human eye to be ignored and apply the changes in power required for the eye. If there are any significant deviations in the particular eye from the normal corneal geometry or spherical aberration correction, then a subsequent over refraction will correct for these deviations.

In one preferred embodiment, the steps in designing a rigid or semi-rigid contact lens with an aspheric posterior curve for a patient with a specific power correction, for myopia or hyperopia, and a specific power profile for presbyopia, are as follows. Starting with the patient's spectacle power and add power requirements and their Keratometric (K) readings, select a posterior curve eccentricity. Based on the posterior curve eccentricity, the posterior central radius is fit steeper than the flat keratometric reading. For a 0.91 eccentricity, the posterior central radius is usually selected 1.75 diopters steeper than flat K, but for a 1.2 eccentricity the posterior central radius can be selected 5 diopters steeper than flat K. Next determine the central distance power of the lens by vertexing the spectacle distance power and subtracting the diopter value of the posterior steepening, this is the center power of the lens in air. Next calculate the central anterior radius of the lens using the posterior central radius, the index of refraction of the lens material, lens center thickness and the center power of the lens in air. Next, using these lens parameters, calculate the center power of the lens on eye by using the index of refraction of tears at the posterior of the lens. Next add the power profile, the change in power from the center power as a function of distance from the center of the lens, to the on-eye center power of the lens. This on-eye power profile is the target that the lens will be designed to create.

The lens is designed by using an on-eye ray trace including a Null Lens compensation to create the targeted on-eye power profile. The curvature of the Null Lens is ideally set to the flat curvature of the patient's eye and is included in the ray trace calculation such that the Null Lens ray trace results are used to correct for the eye's spherical aberration correction.

The resulting lens is then evaluated on the patient's eye for the following:

1) Fit—The lens should center properly and move properly. The central posterior radius and lens diameter can be changed to accomplish this.
2) If the fit is proper, the distance power is evaluated and the near power is evaluated.
   Change the targeted distance and near powers as required. This step will also correct for variations in the patient's spherical aberration correction internal to the eye and for variations in corneal shape.
3) Once the proper fit and proper distance and near powers are determined, the power profile can be modified to improve either the distance visual acuity or the near visual acuity at the expense of the other. This is accomplished by changing the location of where the powers are on the lens, not the value of the powers.

If the patient's lens evaluation requires a change to the lens, a new lens will be designed and manufactured using the modified parameters.

It is understood that the above description is intended to be illustrative and not restrictive. Although various characteristics and advantages of certain embodiments of the present invention have been highlighted herein, many other embodiments will be apparent to those skilled in the art without deviating from the scope and spirit of the invention disclosed including the addition of prism to aid in the fitting of the lens. The scope of the invention should therefore be determined with reference to the claims contained herewith as well as the full scope of equivalents to which said claims are entitled.

Now that the invention has been described,

What is claimed is:

1. A method of designing an anterior curve of a contact lens for the eye of a patient comprising the steps of:
   providing a contact lens material having a posterior, a posterior curve having a predetermined asphericity, an anterior, an index of refraction and a center thickness;
   providing a geometry of a cornea, a distance power correction for the cornea and a near power correction for the cornea;
   determining a central distance power of the contact lens in air;
   calculating a central anterior radius of the contact lens using the posterior curve of the contact lens material, the index of refraction of the contact lens material, the center thickness of the contact lens material and the central distance power of the contact lens in air;
   calculating a center power of the contact lens on the eye of the patient using the index of refraction of tears at the posterior of the contact lens; and
   using an on-eye ray trace, said on-eye ray trace having a null lens compensation to create a targeted on-eye power profile.

2. The method of designing an anterior curve of a contact lens according to claim 1 further comprising providing a curvature of the null lens, the curvature of the null lens is set to a flat curvature of the eye of the patient whereby the null lens is used to compensate for the spherical aberration correction of the eye of the patient.

3. The method of designing an anterior curve of a contact lens according to claim 1 wherein the posterior curve of the contact lens material is used to adjust the centering of the contact lens on the eye of the patient.

4. The method of designing an anterior curve of a contact lens according to claim 1 wherein the posterior curve of the contact lens material is used to adjust the movement of the contact lens on the eye of the patient.

5. The method of designing an anterior curve of a contact lens according to claim 1 further comprising providing a contact lens diameter, the contact lens diameter is adjusted to center the contact lens on the eye of the patient.

6. The method of designing an anterior curve of a contact lens according to claim 1 further comprising providing a contact lens diameter, the contact lens diameter is adjusted to provide the proper movement of the contact lens on the eye of the patient.

7. The method of designing an anterior curve of a contact lens according to claim 1 wherein the targeted on-eye power profile is adjusted to provide proper distance power and proper near power.

8. The method of designing an anterior curve of a contact lens according to claim 1 wherein the targeted on-eye power profile is adjusted to improve distance visual acuity.

9. The method of designing an anterior curve of a contact lens according to claim 1 wherein the targeted on-eye power profile is adjusted to improve near visual acuity.

* * * * *